United States Patent [19]

Burri

[11] Patent Number: 5,193,177
[45] Date of Patent: Mar. 9, 1993

[54] FAULT INDICATING MICROCOMPUTER INTERFACE UNITS

[75] Inventor: Michel Burri, Geneva, Switzerland

[73] Assignee: Motorola, Inc., Schaumburg, Ill.

[21] Appl. No.: 921,426

[22] Filed: Jul. 31, 1992

Related U.S. Application Data

[63] Continuation of Ser. No. 435,124, Nov. 13, 1989, abandoned.

[30] Foreign Application Priority Data

Nov. 26, 1988 [GB] United Kingdom ................. 8827663

[51] Int. Cl.⁵ ........................................... G06F 11/00
[52] U.S. Cl. .................................... 395/575; 395/325; 364/DIG. 1; 364/266; 364/266.4; 364/267.7; 364/260.5; 371/25.1; 371/67.1; 371/70
[58] Field of Search ............... 395/575, 325; 371/25.1, 371/67.1, 70, 20.4

[56] References Cited
U.S. PATENT DOCUMENTS 3,681,578  8/1972  Stevens ................................. 371/5.1
3,735,255  5/1973  Goldman .............................. 371/27
4,283,720  8/1981  Herledan .............................. 340/679

*Primary Examiner*—Eddie P. Chan
*Attorney, Agent, or Firm*—Jonathan P. Meyer

[57] ABSTRACT

A microcomputer interface arrangement includes a microcomputer having I/O ports coupled to individual interface units. A fault detection circuit detects a fault in an interface unit, interrupts the microcomputer and inverts the input state of the faulty unit without affecting the output states so that the faulty unit can be identified by the microcomputer by reading inputs of the interface units.

8 Claims, 1 Drawing Sheet

FAULT INDICATING MICROCOMPUTER INTERFACE UNITS

This application is a continuation of prior application Ser. No. 07/435,124, filed Nov. 13, 1989, now abandoned.

FIELD OF THE INVENTION

This invention relates to a microcomputer interface arrangement and particularly to an interface arrangement which enables identification of a faulty interface unit amongst a plurality of such units coupled to a microcomputer unit.

BACKGROUND OF THE INVENTION

It is known to couple a plurality of interface units, such as power switching units to a microcomputer which controls the switching of the units via respective control lines.

Each such unit is usually provided with a fault indicating output which provides a fault indicating output signal in the event of a fault occurring in the unit. It is common to couple all the fault indicating output terminals together in a wired OR configuration and to the interrupt input of the microcomputer unit.

In the event of a fault occurring in one of the interface units an output signal at its fault indicating output will interrupt the microcomputer to alert it to the fault. In view of the wired OR configuration, it has hitherto not been possible to identify the unit originating the fault indicating signal without separate diagnostic procedures requiring the provision of an extra diagnostic pin and the disturbing of the output states of the units.

SUMMARY OF THE INVENTION

According to the invention there is provided a microcomputer interface arrangement comprising:

a microcomputer unit having a plurality of input/output (I/O) terminals and an interrupt indicating input terminal;

a plurality of interface units each having an input terminal coupled by a two way control line to a respective I/O terminal of the microcomputer unit, an output terminal and a fault indicating terminal, the fault indicating terminals of the plurality of interface units being coupled together and to the interrupt indicating terminal of the microcomputer; output means coupled between the input and output terminals; fault indicating means responsive to a fault condition at the output terminal for providing a fault indicating signal at the fault indicating terminal to interrupt the microcomputer unit and for inverting the input state of the interface unit without affecting the output state whereby the interface unit having a fault condition may be identified.

The fault indicating means preferably includes diagnostic means for providing an output signal in response to a fault condition at the output terminal.

The fault indicating means may further include a controllable switch having an input coupled to the output of the diagnostic means and an output coupled to the fault indicating terminal to provide the fault indicating signal.

The controllable switch may have an output for providing an output voltage in response to the output signal of the diagnostic means and a comparator may be provided for comparing the output voltage with a reference voltage.

Typically the reference voltage is greater than the said output voltage of the controllable switch and current injection means is provided for injecting current into the controllable switch to increase its output voltage above the level of the reference voltage whereby an output signal is provided at the output of the comparator.

Preferably the output means includes latch means is coupled between the input terminal and the output means.

Typically a second controllable switch is coupled between the input terminal and the latch means, the latch means being coupled to one selectable terminal of the switch and an inverter being coupled between the output of the latch means and a second selectable terminal.

The output of the comparator is preferably coupled to a control input of the second controllable switch.

BRIEF DESCRIPTION OF THE DRAWINGS

An exemplary embodiment of the invention will now be described with reference to the accompanying drawings in which.

DETAILED DESCRIPTION OF THE PREFERRED EMBODIMENT

Figure 1:
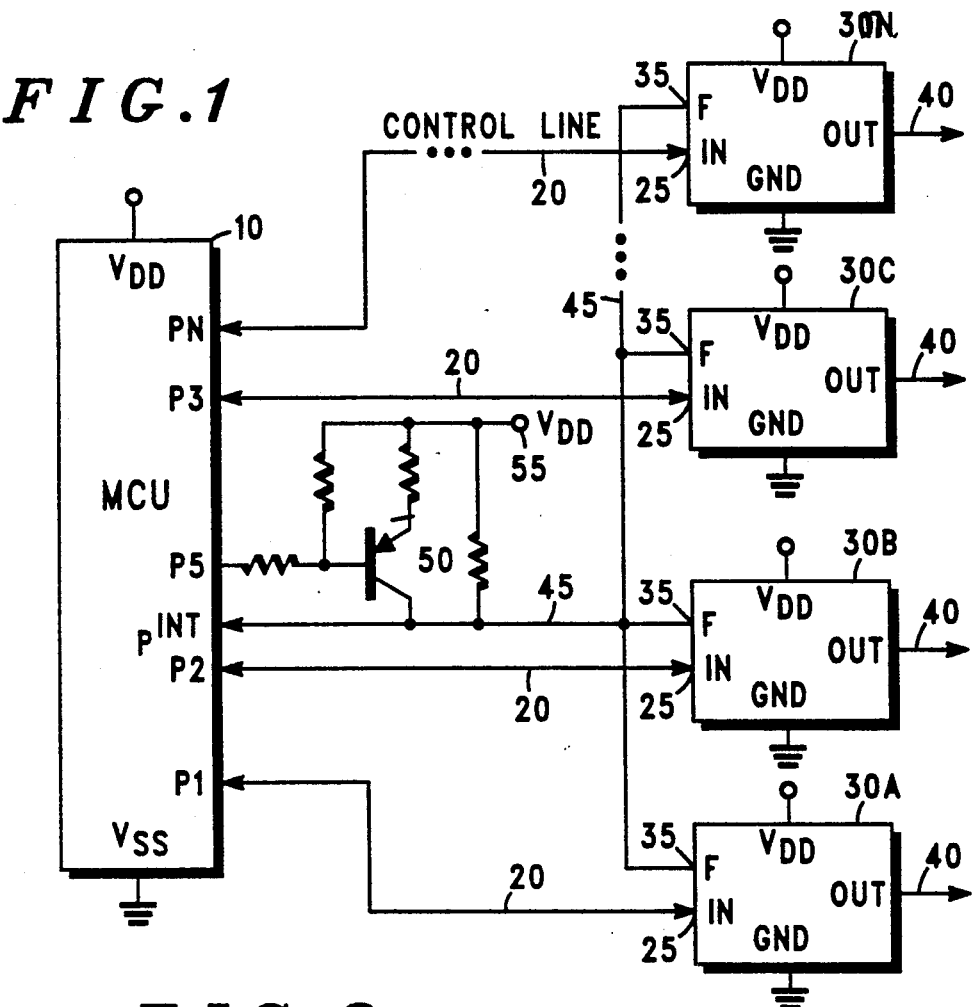
FIG. 1 is a block schematic of a microcomputer interface arrangement in accordance with the invention.

Referring to FIG. 1 a microcomputer unit (MCU) 10 has a plurality of I/O terminals P1, P2, P3 through Pn and an interrupt indicating terminal PINT which may be a unique interrupt terminal or an I/O pin used as an interrupt terminal.

The I/O terminals P1, P2, P3, Pn are coupled by means of respective two way control lines 20 to input terminals 25 of respective interface units 30a, 30b, 30c ... 30n.

Each interface unit 30a through 30n also has a fault indicating terminal 35 and an output terminal 40. All the fault indicating terminals 35 are coupled together in wired OR configuration and to the interrupt terminal PINT of the MCU 10, by means of a fault line 45.

Each interface unit provides an appropriate output state (depending on its function) in response to a data input signal fed to its input terminal 25 from the respective I/O terminal of the MCU 10.

A PNP transistor 50 has its base electrode coupled to a terminal P5 of the MCU 10 and its emitter and collectors coupled respectively to a supply line 55 and to the fault line 45.

In the event of a fault occurring within one of the interface units 30a through 30n a fault indicating signal will appear at the fault indicating output 35 of the faulty unit and will be fed via the fault line 45 to the interrupt input PINT, where it will interrupt the MCU 10.

On being interrupted the MCU initiates a diagnostic procedure to determine which of the interface units is faulty. A signal is applied to the base of the PNP transistor 50 from the terminal P5 of the MCU 10 to turn on the transistor 50. Current is injected by the transistor 50 onto the fault line 45 and into the fault indicating terminal 35 of each interface unit 30.

In response to the current injected onto the fault line 45, the logical value of the data state of the faulty interface unit previously set by the MCU 10 is caused to be inverted whilst the non-faulty units have their data states latched to their originally set values.

With the I/O terminals P1 through Pn set to input mode by the MCU 10, the MCU reads the data values presented at the terminals 25 of the interface units 30 and determines the faulty unit by virtue of its inverted data value. The faulty unit is thus identified without changing the output data values of the interface units.

Figure 2:
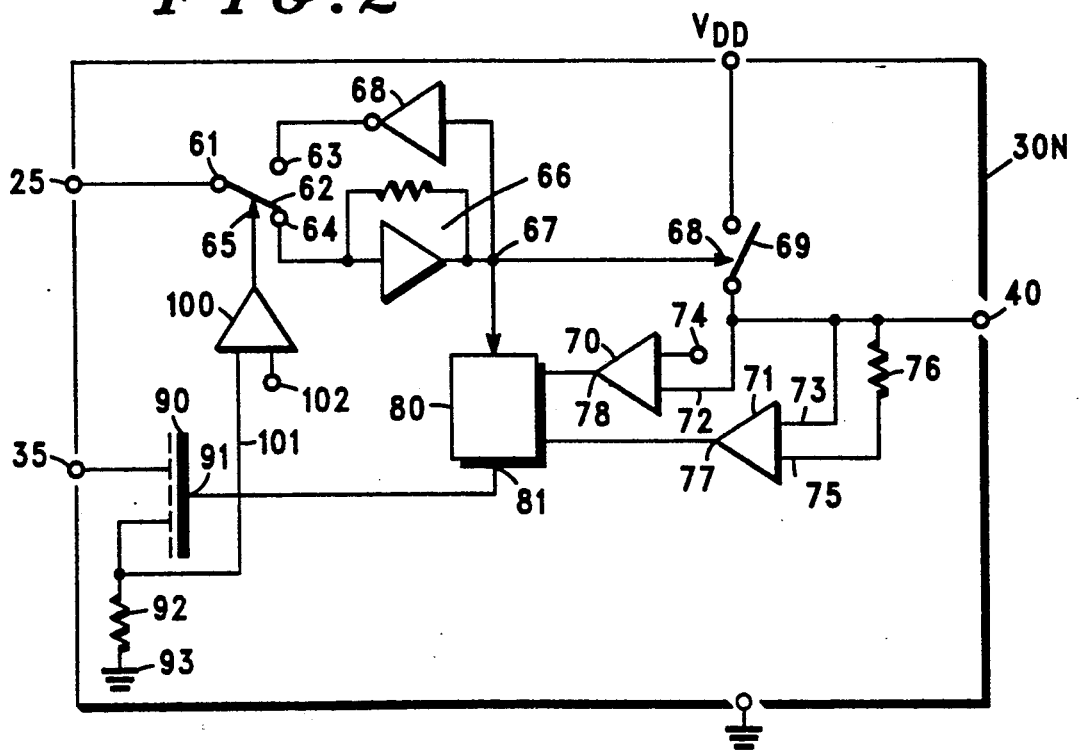
FIG. 2 is a more detailed block diagram of an interface unit of FIG. 1.

Referring now to FIG. 2 there is shown a block schematic of an exemplary interface unit of FIG. 1. In this example the interface unit is a controlled high-side switch for coupling a supply voltage VDD applied to the VDD supply terminal, to the output terminal 40, in response to a digital value applied to the input terminal 25 by the MCU 10.

The input terminal 25 is coupled to the input 61 of a controllable switch 62, which has selectable terminals 63 and 64, selectable in response to a control signal applied to a control input 65.

The switch 62 normally has its input 61 coupled to the terminal 64 to which is also coupled latch 66.

The latch 66 has an output 67 which is coupled via an inverter 68 to the second selectable terminal 63 of the switch 62.

The output 67 of the latch 66 is coupled to the control input 68 of a power switch 69 coupled between the VDD supply terminal and the output terminal 40.

On application by the MCU 10 of an appropriate digital value to the input terminal 25 this value is held at the output of the latch and closes the controllable switch to couple the supply voltage VDD to the output terminal 40 for application to a load.

The output terminal 40 is coupled to a respective input 72, 73 of each of two comparators 70, 71. The comparator 70 is a voltage sensing comparator whose second input 74 receives a reference voltage and provides an output signal in the event of the output voltage falling too low; such a situation might occur if the load resistance becomes too low but is not zero.

The comparator 71 is a current sensing comparator and its second input 75 is coupled to the output terminal 40 via a resistor 76. The comparator 71 senses the voltage drop across the resistor and provides an output signal if the drop becomes too large indicating too high a current flow due to, for example, a short circuit load.

The comparators 70 and 71 have outputs 78 and 77, which are coupled to a diagnostic circuit 80 which is also coupled to the output 67 of the latch. The logic state of the latch output 67 indicates to the diagnostic circuit 80 the intended output state and this intended state is compared with the output states of the comparators 70 and 71 to determine if a fault condition exists.

The diagnostic circuit 80 has an output 81 coupled to the gate control electrode 91 of a MOS transistor 90, the drain of which is coupled to the fault indicating terminal 35, whilst its source is coupled via a resistor 92 to ground reference terminal 93.

The source terminal of the transistor 90 is coupled to one input 101 of a comparator 100 whose other input 102 receives a reference voltage. The comparator 100 has its output 103 coupled to the control input 65 of the controllable switch 62.

In the event of a fault being detected by the diagnostic circuit 80, an output signal is provided at its output 81 and is applied to the gate 91 of the transistor 90 to turn ON the transistor. Current flows in the transistor 90 and a fault indicating voltage is developed at the fault indicating terminal 35. The fault indicating voltage is applied to the interrupt terminal PINT of the MCU 10.

Current flowing through the transistor 90 also develops a voltage across the resistor 92, which voltage appears at the input terminal 101 of the comparator 100. The value of the reference voltage applied to the reference input terminal 102 of the comparator 100 is chosen to be greater than that developed on the resistor 92 so that, at this stage, the comparator provides no output signal. This is to ensure continued normal operation until the MCU 10 initiates a diagnostic test.

As explained above, on initiation of the diagnostic test the I/O terminals of the MCU 10 are switched to input to read the logic state at the input terminals 25 of the interface units 30 and current is injected by the transistor 50 into the fault indicating terminals 35 of each interface unit.

The injected current increases the current flow through the transistor 90 and accordingly the voltage drop across the resistor 92 for the faulty interface unit. The voltage applied to the input 101 of the comparator 100 increases and now exceeds the reference voltage applied to the input terminal 102.

The comparator 100 provides an output signal which switches the controllable switch to couple the input terminal 25 to the selectable terminal 63. At this terminal 63 will appear the inverted logic state to that originally applied to the input terminal 25 and now appearing at the output 67 of the latch 66, due to the connection of the inverter 68. Thus the input terminal 25 will also indicate the inverse logic state to that set by the MCU 10 and latched at the output 67 of the latch 66.

In all other interface units where no fault is detected, the respective transistor 90 will not be turned ON and the controllable switches 62 will maintain the coupling of the input terminals 25 to the non-inverted outputs 67 of the latches 66 and the MCU will accordingly read the originally set logic states.

Thus the interface arrangement of the invention allows the detection not only of a fault condition, but also the identification of a faulty interface unit without losing or otherwise changing the output states of the correctly operating units.

After completion of the diagnostic test the transistor 50 is turned off and the I/O terminals P1 through Pn are once more set in output with their original data values restored. The removal of the current injected into the transistor 90 will result in the removal of the output signal of the comparator 100 and the switch 62 will revert to its original condition in which the input terminal 25 is coupled to the input of the latch 66.

The embodiment described is by way of example only and modifications may be made without departing from the scope of the invention. For example although described with reference to a high side switch interface, the invention is applicable to any kind of interface in which the output logic state is controlled in dependence upon an input logic state supplied by a microcomputer output. Also the particular fault conditions detected are exemplary and other or additional fault detecting means may be employed, such as open circuit load detection and thermal limit detection.

I claim:

1. A microcomputer interface arrangement comprising:
   a microcomputer unit having a plurality of input/output (I/O) terminals and an interrupt indicating input terminal;

a plurality of interface units each comprising:
  i) an input terminal coupled by a two way control line to a respective I/O terminal of the microcomputer unit;
  ii) a latch having an input coupled to the input terminal and an output;
  iii) an output terminal and a fault indicating terminal, the fault indicating terminals of the plurality of interface units being coupled together and to the interrupt indicating terminal of the microcomputer;
  iv) output means coupled between the output of the latch and output terminals for setting a state of the output terminal in response to a data value held in the latch;
  v) fault indicating means responsive to a fault condition at the output terminal for providing a fault indicating signal at the fault indicating terminal to interrupt the microcomputer unit;
  vi) an inverter having an input coupled to the output of the latch and an output; and
  vii) means responsive to the fault indicating signal for coupling the output of the inverter to the input terminal to invert a state thereof without affecting a state of the latch whereby the interface unit having a fault condition may be identified.

2. The arrangement of claim 1 wherein the fault indicating means further comprises:
  diagnostic means for providing an output signal in response to a fault condition at the output terminal; and
  means for coupling the output signal to the fault indicating terminal.

3. The arrangement of claim 2 wherein the means for coupling the output signal to the fault indicating terminal further comprises a controllable switch having an input coupled to receive the output signal of the diagnostic means and an output coupled to the fault indicating terminal to provide the fault indicating signal.

4. The arrangement of claim 3 wherein the output of the controllable switch provides an output voltage in response to the output signal of the diagnostic means.

5. The arrangement of claim 4 wherein a comparator is provided for comparing the output voltage of the controllable switch with a reference voltage.

6. The arrangement of claim 5 wherein the reference voltage is greater than the said output voltage of the controllable switch and current injection means is provided for injecting current into the controllable switch to increase its output voltage above the level of the reference voltage whereby an output signal is provided at the output of the comparator.

7. The arrangement of claim 1 wherein each of the plurality of interface units further comprises:
  a second controllable switch coupled between the input terminal and the input of the latch, the input of the latch being coupled to one selectable terminal of the second controllable switch and the inverter being coupled between the output of the latch and a second selectable terminal of the second controllable switch, whereby when the second selectable terminal of the second controllable switch is selected the input terminal is coupled thereto to invert the state of the input terminal.

8. The arrangement of claim 7 wherein an output of a comparator is coupled to a control input of the second controllable switch.

* * * * *